June 11, 1940.  J. E. HOGUE  2,204,496
CONFECTION MAKING APPARATUS
Filed April 25, 1933  2 Sheets-Sheet 1
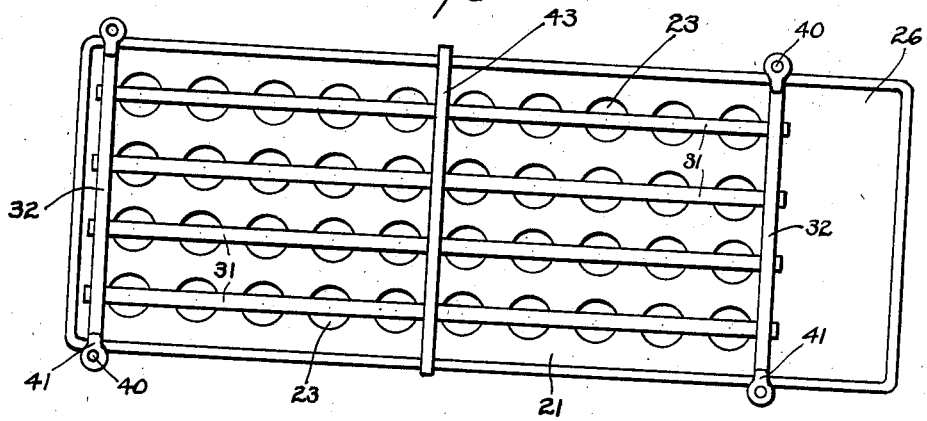
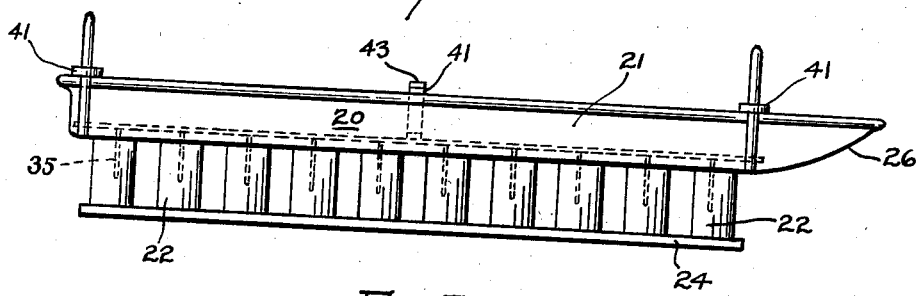
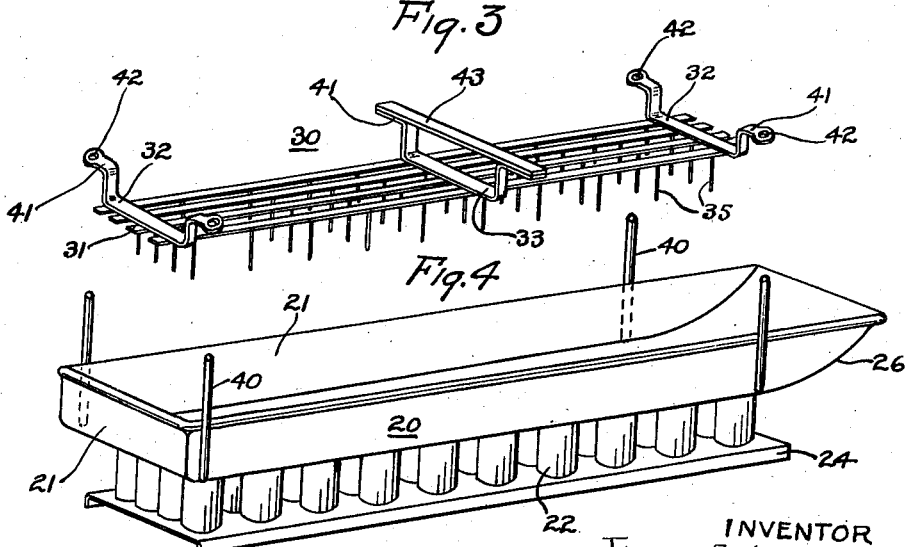
INVENTOR
James Earl Hogue
BY
*Donald B. Waite*
ATTORNEY June 11, 1940.  J. E. HOGUE  2,204,496
CONFECTION MAKING APPARATUS
Filed April 25, 1933   2 Sheets-Sheet 2
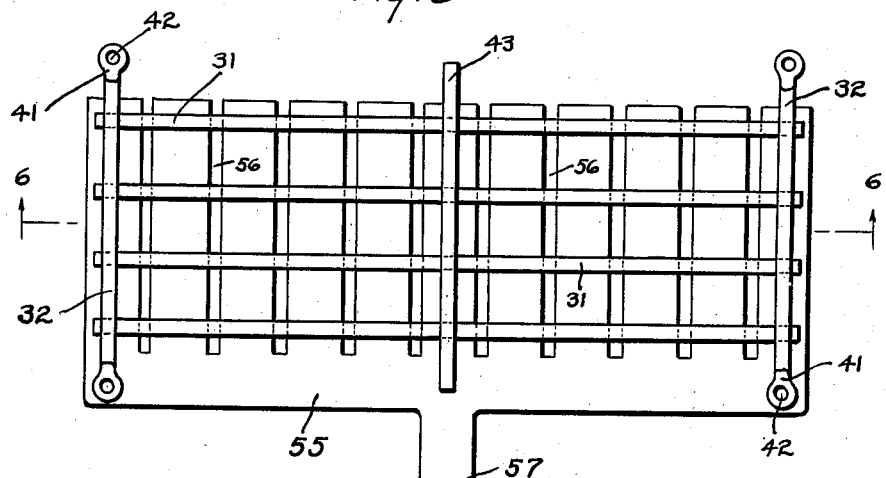
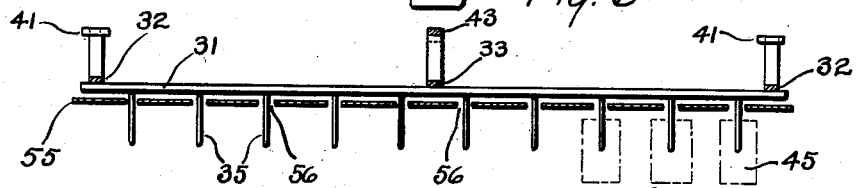
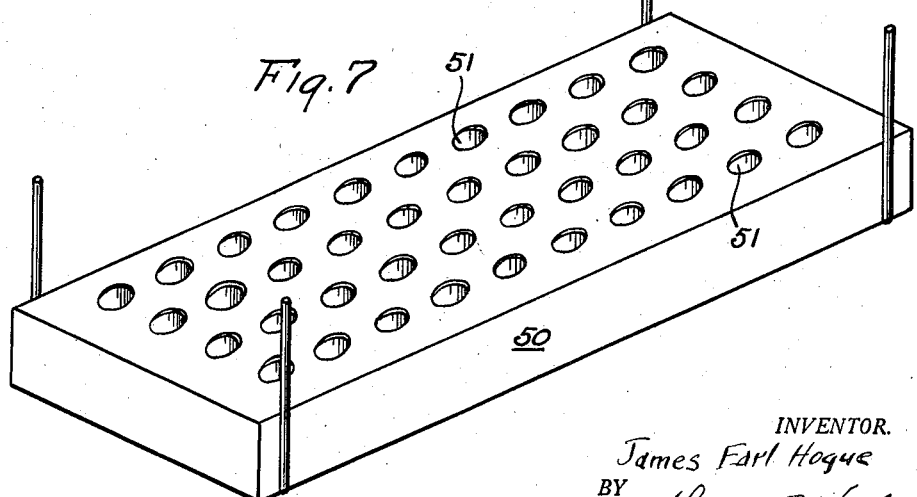
INVENTOR.
James Earl Hogue
BY
ATTORNEYS.

Patented June 11, 1940

2,204,496

UNITED STATES PATENT OFFICE 2,204,496

CONFECTION MAKING APPARATUS

James E. Hogue, Hot Springs, Ark., assignor to Joe Lowe

Application April 25, 1933, Serial No. 667,844

3 Claims. (Cl. 107—8)

The present invention relates to apparatus for manufacturing frozen confection and more particularly to apparatus for manufacturing frozen individual novelties.

Frozen individual novelties are often formed by solidifying a mix in individual molds by freezing the same while in the molds and in order to remove the frozen confection from the mold, an insert in the form of a peg or pin is bonded with the confection, preferably by freezing the peg to the confection while the confection is being refrigerated.

Preferably the molds are disposed beside one another in a plurality of rows and a rack is provided having a plurality of depending pins which are spaced from one another to coincide with the spacing of the molds. These pins are arranged to extend into the molds and are adapted to be frozen to the confection while the confection is being frozen. After the confections are frozen and the bond between the same and the molds are broken the pins are utilized for withdrawing the confections from the molds and may be utilized for holding or manipulating the same when a coating, such as chocolate, is being applied.

One of the objects of the present invention is to provide improved confection making apparatus including pins and a stripper plate for stripping the frozen confections from the pins, which stripper plate is provided with slots, arranged to receive a plurality of pins, and which can be inserted in position above the confection on the pins.

Further objects and advantages will be apparent from the following description, reference being had to the accompanying drawings, wherein a preferred form of embodiment is clearly shown.

In the drawings:

Fig. 1 is a top plan view of my improved confection making apparatus;

Fig. 2 is a side view thereof;

Fig. 3 is a perspective view of the lifter rack having the depending pins;

Fig. 4 is a perspective view of the mold structure;

Fig. 5 is a top plan view of the lifter rack and the stripper plate or fork;

Fig. 6 is a sectional view taken on line 6—6 of Fig. 5;

Fig. 7 is a perspective view of a bag or wrapper containing rack.

Referring to the drawings, there is shown a sheet metal mold structure 20 having a top pan 21 and depending molds 22. The molds are formed of tubes having their upper parts fixed to the bottom of the pan in alignment with holes 23. The lower parts of the tubes are closed by fixing a plate 24 thereto. The mix, such as ice cream, sherbet, water ice, custard etc., is placed in the pan 21 to fill the molds 22. One end of pan 21 is provided with a sweep 26 for the ready removal of excess mix.

The lifter rack 30 comprises a plurality of parallelly arranged flat strips of metal 31 which are tied together at their ends by transversely disposed metal strips 32 and by a similar center strip 33 by being welded or soldered thereto. Depending pins or pegs 35 are secured to strips 31, as by soldering or welding, and are spaced apart to coincide with the spacing of the molds so that when the lifter rack 30 is placed in position over the mold structure 20, each mold 22 will receive a pin 35. Means is provided for guiding the pins 35 in their vertical movement with respect to the molds 22. This means comprises the transverse strips 32 and posts 40 which latter are fixed onto the mold pan 21. The strips 32 are bent upwardly and outwardly to form rests 41 and each rest is perforated at 42 to receive a post 40. Thus the posts 40 and perforations 42 in rests 41 require a substantially longitudinal movement of the pins 35 into and out of the molds 22.

The center strip 33 also forms rests 41 which are reinforced by a strip 43 which strip 43 may be used as a handle for the lifter rack 30. These rests 41 are arranged to engage the top side walls of the pan 21 and are spaced such a distance from the longitudinal strips 31 so as to maintain the strips 31 spaced from the bottom of the pan 21. The spacing is such that the ice cream will not come in contact with the strips 31 even though it expands during freezing so that there will be a space between the tops of the frozen confection and the bottoms of strips 31.

In operation, sufficient mix is placed in the pan to fill all of the molds 22 and in case of a semi-fluid, such as ice cream mix, the mix is packed into the molds 22 by using a squeegee which squeegee is also used to scrape the excess mix out of the sweep portion 26. The lifter rack 30 is placed in position so that the pins 35 extend into the molds 22 before the mix is solidified and preferably directly after the molds are filled. The mix in the molds is then subjected to refrigeration and by virtue of the construction of the molds, the mold structure 20 can be partly immersed to the tops of the molds 22 in a refrigerated brine in a tank. After the mix is solidified, the mold structure is withdrawn from the refrigerating tank and then the molds 22 are subjected to a warm environment and preferably are momentarily immersed in warm water to melt the immediate side and bottom surfaces of the confections in order to break the bond between the confections and the molds. Then by lifting upwardly on the lifter rack, the confections will be withdrawn from the molds 22, the adhesive bond betwen the pins 35 and confection, due to freezing, being sufficient for this purpose. The guide posts 40 require a straight vertical movement of the rack 30 and thus prevent a lateral movement being imparted to the pins 35 which may have a tendency to cause loosening of the pins in the confection.

The confection at this time will be disposed as shown in dot and dash lines in Fig. 6 and indicated by reference numeral 45. It will be noted that the tops of the confections 45 are spaced from the bottoms of strips 31. If it is desirable to coat the confection, it is preferable to utilize the pins 35 for holding or manipulating the confections while the coating is being applied. For example, the lifter rack can be used for immersing the confection, while on the pins 35, in a bath of warm chocolate.

At this time the confections 45 can be placed in wrappers or containers. To accomplish this, I have provided a container rack 50 having a plurality of pockets 51 spaced from one another to coincide with the spacing of the confections 45 on the lifter rack 30. Suitable bags or containers are placed in these pockets 51; then the lifter rack 30, with the confections 45 thereon, is placed over the container rack 50 and it is then lowered so that the confections enter the containers. Posts 52 are provided on the container rack 50 and are received by the perforations 42 on the lifter rack 30 for guiding the latter.

For the purpose of separating the pins 35 from the confection, I have provided a stripper plate 55. This plate is provided with a plurality of slots 56 to form a fork-shaped stripper each of the slots being arranged to receive a plurality of pins 35. A handle 57 on the fork 55 is used for manipulating the same. The fork is inserted between the bottom of strips 31 of the lifter rack and the tops of the confections 45 as shown in Figs. 5 and 6 and then the fork 55 is pushed downwardly and/or the lifter rack 30 is pulled upwardly causing the engagement of the prongs of the fork with the tops of the confection. When practicing the present invention utilizing the container rack 50, the fork 55 is inserted above the platform of the rack and then the lifter rack 30 is lifted upwardly, the post 52 at this time insuring a straight vertical movement of the lifter rack. In that case it will be necessary to make the end prongs of the fork narrower in order that the fork can be inserted without engaging the posts 52. In actual practice, it has been found that the confection can be stripped from the pins 35 if one prong only engages the confection and therefore the end prongs may be omitted if desirable.

The pins 35 are preferably made of small gauge wire which will yield with the pressures necessary to carry out the operation of the apparatus, i. e., if the pins are bent from normal they can nevertheless be withdrawn from the frozen confection without breaking the latter because, being yieldable, they can bend while being withdrawn from the confection to conform to the tortuous passages which they form in the confection while molding the letter.

While the form of embodiment of the present invention as herein disclosed constitutes a preferred form, it is to be understood that other forms might be adopted all coming within the scope of the claims that follow.

I claim:

1. A confection making apparatus comprising a portable carrier, pins depending from said carrier in spaced relation for supporting a series of confections bonded to said pins, a plate having a series of open ended elongated slots extending across said plate in parallel spaced relation, said slots being spaced at intervals corresponding to the distance between pin centers, said plate being slidably insertable between said carrier and the tops of confections bonded to the pins, and said plate being slidable longitudinally along the pins to exert pressure on the tops of all confections at the same time thus breaking the bond between the pins and confections and stripping all confections off all pins in one operation.

2. A confection making apparatus comprising a portable carrier, a plurality of pins depending from said carrier in spaced relation for supporting a plurality of confections when bonded to said pins, a slotted plate, said slot extending across said plate and being open at one end to accommodate the pins, and said plate being first slidably insertable between said carrier and the tops of confections when bonded to the pins and then longitudinally slidable along the pins to break the bond between all pins and all confections and thus strip all confections in one operation.

3. Apparatus for harvesting molded frozen confections comprising a carrier, a row of pins depending from said carrier in spaced relation for supporting confections when congealed on said pins, means secured to the frame of said carrier adapted to cooperate with a mold to space the frame of said carrier away from the tops of the confections while said confections are being congealed on the pins, a plate, and an elongated slot extending across said plate, said plate being first slidably insertable between the carrier frame and the tops of the confections congealed on the pins to position the pins in the elongated slot, and then longitudinally slidable along the pins to strip the confections from the pins in one single operation.

JAMES E. HOGUE.